(12) United States Patent
Guo et al.

(10) Patent No.: US 11,460,576 B2
(45) Date of Patent: Oct. 4, 2022

(54) TRANSMITTER HAVING BEAM SHIFTER FOR LIGHT DETECTION AND RANGING (LIDAR)

(71) Applicant: BEIJING VOYAGER TECHNOLOGY CO., LTD., Beijing (CN)

(72) Inventors: Yonghong Guo, Mountain View, CA (US); Youmin Wang, Berkeley, CA (US); Chao Wang, Milpitas, CA (US); Yue Lu, Los Gatos, CA (US); Lingkai Kong, Palo Alto, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 839 days.

(21) Appl. No.: 16/388,839

(22) Filed: Apr. 18, 2019

(65) Prior Publication Data

US 2020/0333461 A1 Oct. 22, 2020

(51) Int. Cl.
*G01S 17/00* (2020.01)
*G01S 17/26* (2020.01)
*G01S 17/89* (2020.01)
*G02B 27/30* (2006.01)
*G02B 27/09* (2006.01)
*G01S 17/931* (2020.01)

(52) U.S. Cl.
CPC .............. *G01S 17/26* (2020.01); *G01S 17/89* (2013.01); *G01S 17/931* (2020.01); *G02B 27/0944* (2013.01); *G02B 27/30* (2013.01)

(58) Field of Classification Search
USPC ................................................ 356/4.01, 5.01
See application file for complete search history.

(56) References Cited

U.S. PATENT DOCUMENTS

| 8,311,067 B2* | 11/2012 | Ensher | H01S 5/141 |
| | | | 372/99 |
| 2009/0323737 A1* | 12/2009 | Ensher | H01S 5/141 |
| | | | 372/102 |
| 2012/0091372 A1* | 4/2012 | Molnar | H01L 27/14625 |
| | | | 257/E31.127 |
| 2015/0125943 A1* | 5/2015 | Molnar | H01L 27/1446 |
| | | | 356/614 |
| 2016/0026253 A1* | 1/2016 | Bradski | H04N 13/128 |
| | | | 345/8 |

(Continued)

FOREIGN PATENT DOCUMENTS

| WO | WO-2015192117 A1 * | 12/2015 | ............. A63F 13/00 |
| WO | WO-2019196135 A1 * | 10/2019 | ............. G01S 17/08 |
| WO | WO-2020158419 A1 * | 8/2020 | ......... G02B 27/4205 |

*Primary Examiner* — James R Hulka
(74) *Attorney, Agent, or Firm* — Bayes PLLC

(57) ABSTRACT

Embodiments of the disclosure provide transmitters for light detection and ranging (LiDAR). The transmitter includes a laser source, a light collimator, and a beam shifter. The laser source is configured to provide a native laser beam. The light collimator is configured to collimate the native laser beam to form an input laser beam transmitting along a lateral direction. The beam shifter is configured to shift the input laser beam along a vertical direction perpendicular to the lateral direction by a displacement to form an output laser beam. The output laser beam and the input laser beam are parallel to each other.

20 Claims, 8 Drawing Sheets

(56) References Cited

U.S. PATENT DOCUMENTS

| | | | | |
|---|---|---|---|---|
| 2016/0238772 A1* | 8/2016 | Waldern | | G02F 1/13342 |
| 2018/0316160 A1* | 11/2018 | Raring | | H01S 5/3203 |
| 2019/0094981 A1* | 3/2019 | Bradski | | G06F 3/017 |
| 2019/0154439 A1* | 5/2019 | Binder | | G01S 13/878 |
| 2019/0310353 A1* | 10/2019 | Sun | | G01S 17/42 |
| 2020/0292745 A1* | 9/2020 | Waldern | | G02B 5/32 |

* cited by examiner

US 11,460,576 B2

TRANSMITTER HAVING BEAM SHIFTER FOR LIGHT DETECTION AND RANGING (LIDAR)

TECHNICAL FIELD

The present disclosure relates to a Light Detection and Ranging (LiDAR) system, and more particularly to, a transmitter having a beam shifter for LiDAR.

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

A LiDAR transmitter usually requires combining power from multiple laser diodes to meet the output power requirement. The multiple laser diodes are often spatially placed apart, and the laser beams emitted by these laser diodes are collimated and combined. The laser beams transmit at different elevation for power combining. However, it can be difficult to transmit the laser beams at desired elevation.

Embodiments of the disclosure address the above problems by an improved transmitter having a beam shifter for LiDAR.

SUMMARY

Embodiments of the disclosure provide a transmitter for LiDAR. The transmitter includes a laser source, a light collimator, and a beam shifter. The laser source is configured to provide a native laser beam. The light collimator is configured to collimate the native laser beam to form an input laser beam transmitting along a lateral direction. The beam shifter is configured to shift the input laser beam along a vertical direction perpendicular to the lateral direction by a displacement to form an output laser beam, the output laser beam and the input laser beam being parallel to each other.

Embodiments of the disclosure also provide another transmitter for LiDAR. The transmitter includes a laser source, a light collimator, at least one beam shifter, and a beam combiner. The laser source is configured to provide a plurality of native laser beams. The light collimator configured to collimate the plurality of native laser beams to a plurality of input laser beams transmitting along a lateral direction. The at least one beam shifter is configured to shift at least one of the plurality of input laser beams along a vertical direction perpendicular to the lateral direction each by a respective displacement to form at least one output laser beam. The at least one of the plurality of input laser beam is parallel with the respective output laser beam. The beam combiner is configured to receive the at least one output laser beam.

Embodiments of the disclosure also provide another transmitter for LiDAR. The transmitter includes a laser source, a light collimator, a beam shifter, and a beam combiner. The laser source is configured to provide a plurality of native laser beams. The light collimator is configured to collimate the plurality of native laser beams to a plurality of collimated laser beams transmitting along a lateral direction. The beam shifter is configured to shift one of the plurality of collimated laser beams along a vertical direction perpendicular to the lateral direction by a displacement to form a shifted laser beams. The one of the plurality of collimated laser beam is parallel with the shifted laser beam. The beam combiner is configured to receive the shifted laser beam and at least one non-shifted collimated laser beam, the shifted laser beam and the at least one non-shifted laser beam each being at a different elevation along the vertical direction.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

In the present disclosure, the fast axis is parallel to the z axis, the slow axis is parallel to the y axis, and the optical axis is parallel to the x axis. The z axis (e.g., the vertical axis/direction) can be perpendicular to the x-y plane (e.g., the horizontal/lateral plane), and the x-axis and the y axis can be perpendicular to each other. The x-axis/direction and the y-axis/direction can each be referred to as a lateral direction.

In the present disclosure, the term "incident direction" of a light beam refers to the direction defined by the incident angle between the light beam and the surface normal of the object the light beam is incident on or exiting.

In the present disclosure, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

Figure 1:
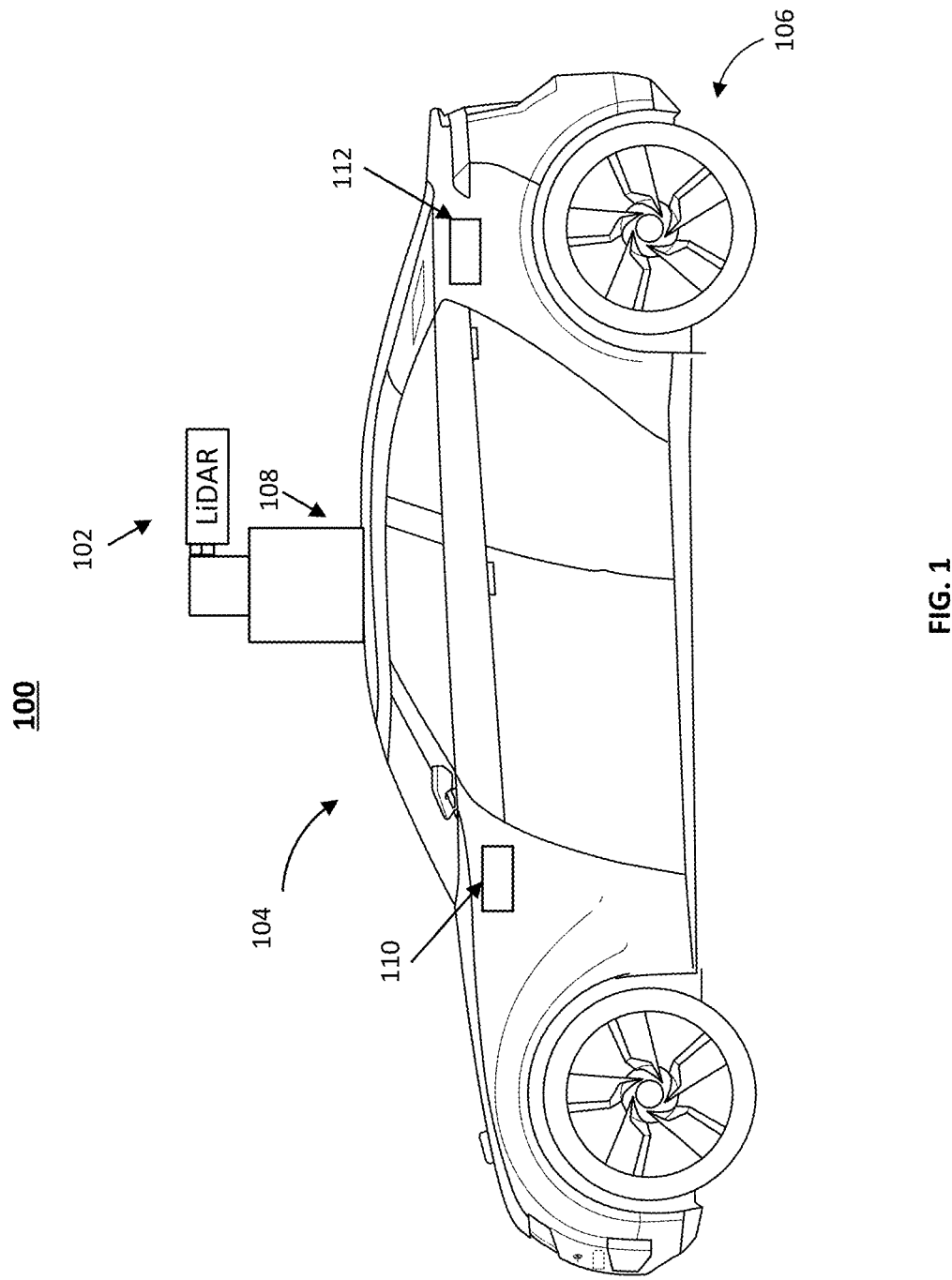
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be any suitable moving vehicle such as an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors. By combining the GPS receiver and the IMU sensor, sensor 110 can provide real-time pose information of vehicle 100 as it travels, including the positions and orientations (e.g., Euler angles) of vehicle 100 at each time stamp. In some embodiments of the present disclosure, pose information may be used for calibration and/or pretreatment of the point cloud data captured by LiDAR system 102.

Consistent with the present disclosure, vehicle 100 may include a local controller 112 inside body 104 of vehicle 100 or communicate with a remote computing device, such as a server (not illustrated in FIG. 1), for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
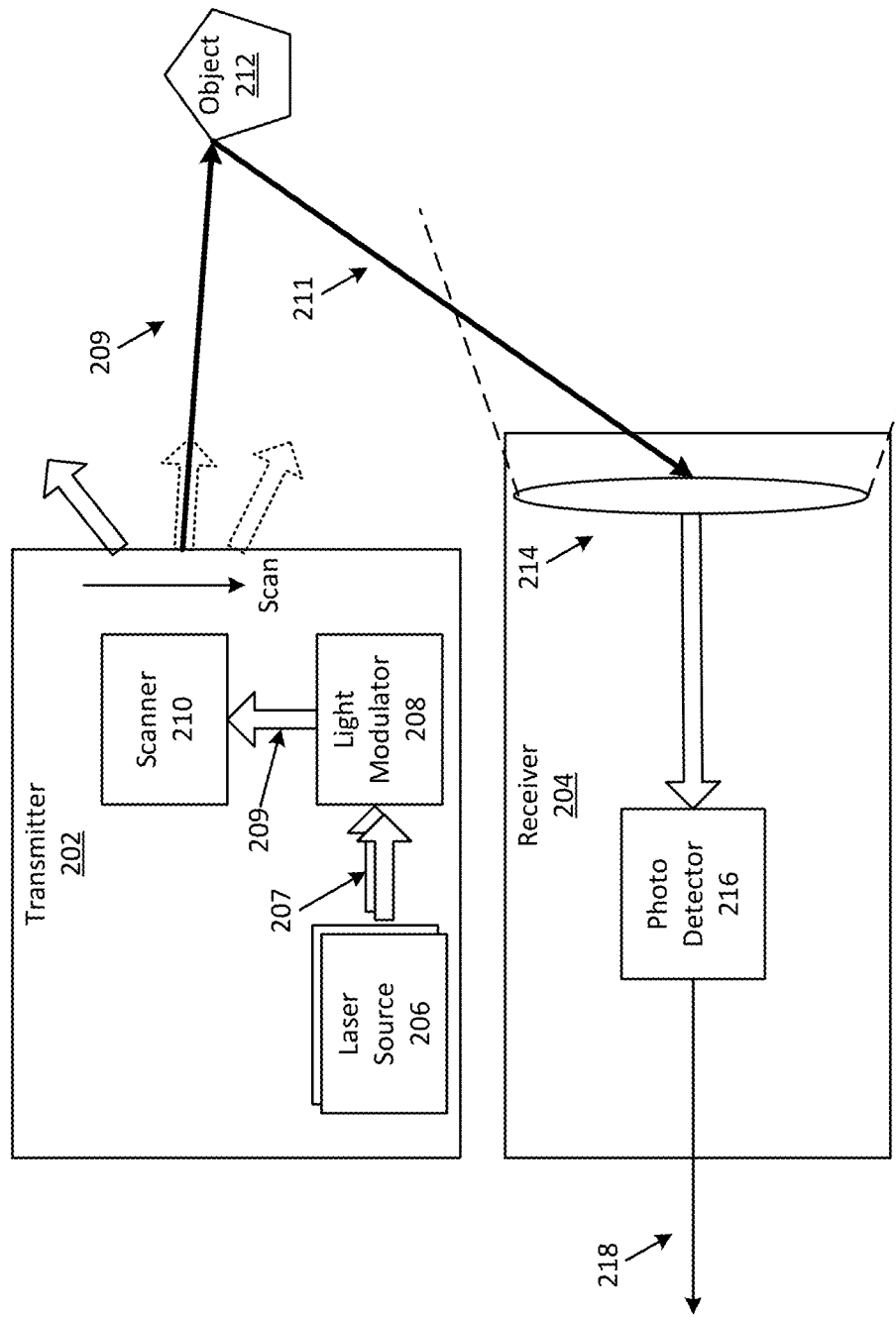
FIG. 2 illustrates a block diagram of an exemplary LiDAR system having a transmitter with a beam shifter, according to embodiments of the disclosure.

FIG. 2 illustrates a block diagram of an exemplary LiDAR system 102 having a transmitter 202 with a light modulator 208, according to embodiments of the disclosure. LiDAR system 102 may include transmitter 202 and a receiver 204. Transmitter 202 may emit laser beams within a scan angle. Transmitter 202 may include one or more laser sources 206, light modulator 208, and a scanner 210. Consistent with the disclosure of the present application, light modulator 208 can be included in transmitter 202 to spatially collimate and combine multiple laser beams provided by multiple laser sources 206 into a single combined laser beam and minimize the beam divergence in the combined laser beam based on beam shifting.

In LiDAR applications, to achieve high resolution and long distance ranging, light source of high brightness is often employed. The high-brightness light source often has features such as high power and small BPP (beam parameter product) at the same time. Due to the fill factor of emitting area in the slow-axis direction, a single-emitter pulse laser diode often has better brightness than multi-junction (also in the form of/named as multi-epi, multi-stack, or multi-stripe) pulse laser diodes, but can be more difficult to be combined together to achieve higher overall power. For example, in spatial beam multiplexing for power combining, single-emitter pulse laser diodes are stacked into a "staircase" holder so that the pulsed laser emission can be spatially separated and then multiplexed. In other words, single-emitter pulse laser diodes can be placed at different stairs of the staircase holder so these single-emitter pulse laser diodes can lase from different elevations. The pulsed laser emission from different single-emitter pulse laser diodes can then be multiplexed at different elevations by a combiner.

The staircase holder can be made using mechanically machining, which is not considered a cost effective way to control mechanical step height error under 20 μm for precise power combining. This can make it difficult to synchronize the high-speed/short-pulsed laser beams at desired precision. The ToF (time of flight) measurement in LiDAR application can be impacted. Also, the circuit boards (e.g., printed circuit boards or PCBs) need to be placed on different elevations to maintain the coupling with respective the single-emitter pulse laser diodes, making it more difficult to manufacture laser source 206 at a desired cost.

The present disclosure provides a beam shifter and a method to use the beam shifter to vertically separate laser beams that are emitted by single-emitter pulse laser diodes placed on a same elevation. The displacement between an input laser beam and an output laser beam of the shifter may be known so a laser beam can be shifted, using one or more beam shifters, to a desired elevation before entering a combiner. By applying one or more beam shifters, laser beams can be shifted along the vertical direction to desired elevation. Thus, single-emitter pulse laser diodes can be placed on a same elevation (e.g., a holder with a leveled top surface), and laser beams emitted by these single-emitter pulse laser diodes can still be separated vertically and enter the combiner at desired elevation, reducing the manufacturing cost and making it easier to combine the laser beams with minimized power loss.

As described below in detail, light modulator 208 separate laser beams, emitted by laser source 206 and transmitting at a same elevation, along the vertical direction so the elevation of the separated laser beams are suitable for power combining. The elevation (e.g., level or position along the vertical direction/axis) of a laser beam can be adjusted before being combined with other laser beams. Specifically, light modulator 208 can include a beam shifter arranged in a transmission path of a laser beam to vertically shift the laser beam before the laser beam enters a combiner of transmitter 202, which combines all light beams for scanning. The shifted laser beam can be parallel to the laser beam (e.g., before the shifting) and can transmit along a same direction/path as the laser beam (e.g., before the shifting). Accordingly, the elevation of laser beams passing through one or more beam shifters may be adjusted to their desired/optimized elevation when entering the combiner, e.g., for minimum power loss. Meanwhile, high-speed/short-pulse laser beams from different laser diodes can be synchronized better, leading to time of flight (ToF) measurement with higher precision.

As part of LiDAR system 102, transmitter 202 can sequentially emit a stream of pulsed laser beams in different directions within its scan angle, as illustrated in FIG. 2. A laser source 206 may be configured to provide a native laser beam 207 in a respective incident direction to light modulator 208. In some embodiments of the present disclosure, each laser source 206 may generate one or more pulsed laser beams in the ultraviolet, visible, or near infrared wavelength range.

In some embodiments of the present disclosure, each laser source 206 includes one or more pulsed laser diode (PLD.) A PLD may be a semiconductor device similar to a light-emitting diode (LED) in which the laser beam is created at the diode's junction. In some embodiments of the present disclosure, a PLD includes a PIN diode in which the active region is in the intrinsic region, and the carriers (electrons and holes) are pumped into the active region from the N and P regions, respectively. Depending on the semiconductor materials, the wavelength of n laser beam 207 provided by a PLD may be smaller than 1,100 nm, such as 405 nm, between 445 nm and 465 nm, between 510 nm and 525 m, 532 nm, 635 nm, between 650 nm and 660 nm, 670 nm, 760 nm, 785 nm, 808 nm, or 848 nm.

Figure 3A:
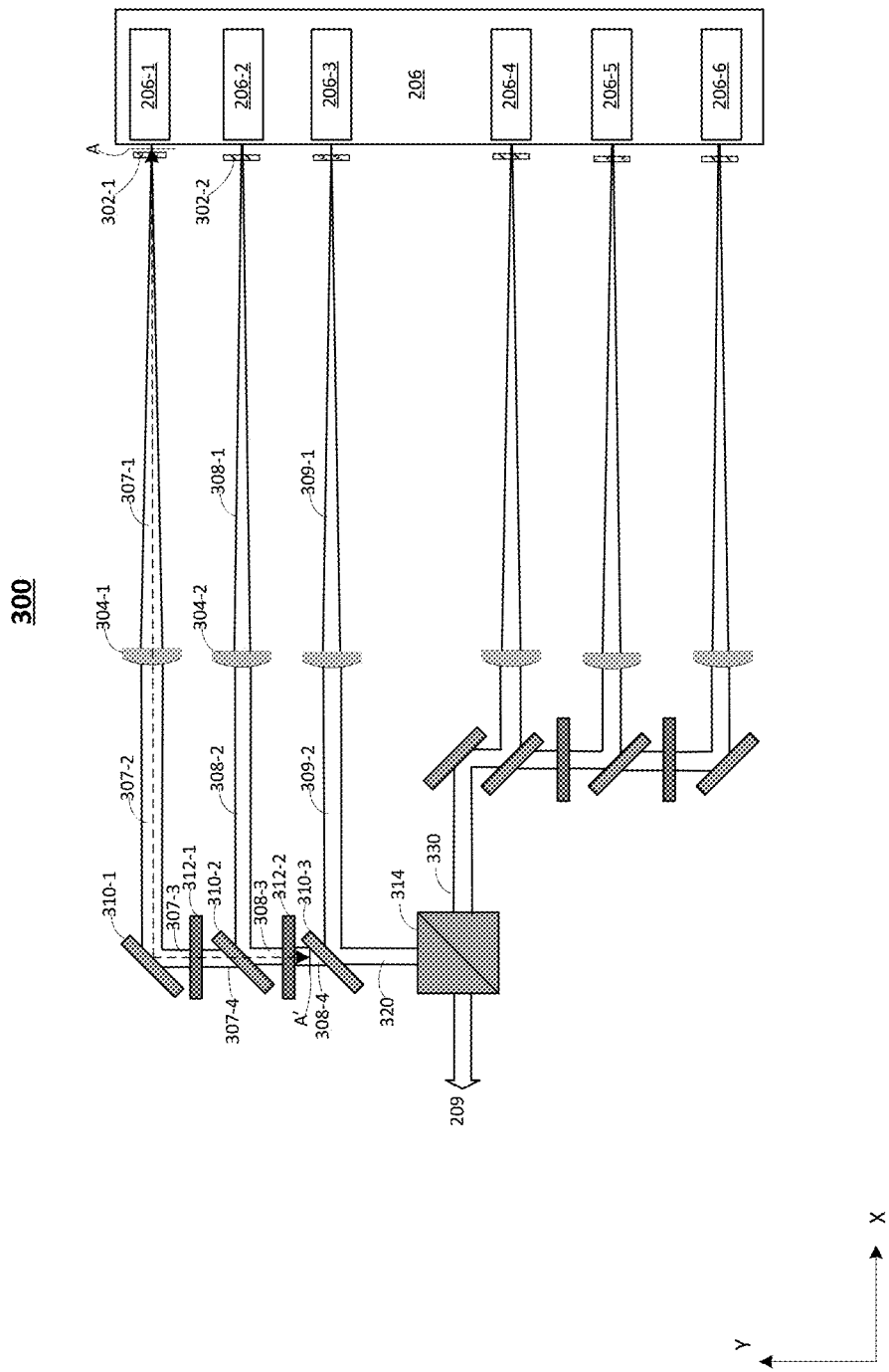
FIG. 3A illustrates an overview of an exemplary transmitter having a plurality of beam shifters, according to embodiments of the disclosure.

In some embodiments of the present disclosure, each of laser sources 206 includes one or more single-junction PLDs (e.g., single-emitter pulsed laser diodes). The one or more single-junction PLDs are arranged nominally in a horizontal/lateral plane (e.g., a leveled surface) and the native laser beams emitted by the one or more single-junction PLDs can be collimated, shifted, and combined to form combined laser beam 209. FIG. 3A illustrates a top view of a schematic diagram depicting light transmission and spatial relationship in laser source 206 and light modulator 208. Light modulator 208 may include one or more beam shifters (e.g., 312-1, 312-2, . . . ) arranged along the transmission paths of native laser beams to shift the collimated and/or reflected laser beams vertically by a respective displacement. The shifted laser beams may be parallel to the respective laser beams before the shifting. Each displacement may be individually adjusted, if necessary, so that all the laser beams in an initial combined laser beam (e.g., including shifted and any non-shifted laser beams) at the entrance of the combiner can have desired elevation for power combining.

As shown in FIG. 3A, laser source 206 may include a plurality of PLDs (e.g., 206-1, 206-2, . . . ), and light modulator 208 may include a plurality of collimators (e.g., 304-1, 304-2, . . . ), a plurality of mirrors (e.g., 310-1, 310-2, . . . ), at least one beam shifter (e.g., 312-1, 312-2, . . . ), and a beam combiner 314 (e.g., a polarization beam splitter or PBS). In some embodiments, each PLD (e.g., 206-1, 206-2, . . . ) is packaged/embedded in a respective laser chip. Laser source 206 may include a printed circuit board (PCB) on which the plurality of PLDs 206 are mounted. The PCB may have a leveled top surface so the PLDs (e.g., 206-1, 206-2, . . . ) may be placed on nominally a same elevation, e.g., making it easier for electronic/circuit connection. In some embodiments, light source 206 or light modulator 208 includes a plurality of focusing lenses (e.g., 302-1, 302-2, . . . ), each corresponding to a respective PLD (e.g., 206-1, 206-2, . . . ) for focusing the respective native laser beam before it transmits to the respective collimator. For ease of description, in the present disclosure, one or more light beams (e.g., laser beams) incident on an optical element (e.g., mirrors, collimators, lenses, beam shifters, and combiner) is referred to as an input of the optical element, one or more light beams (e.g., laser beams) exiting the optical element is referred to as an output of the optical element. In some embodiments, each of the mirrors (e.g., 310-1, 310-2, . . . ) includes one or more optical devices configured to receive and reflect a laser beam on one side, and receive and transmit another laser beam on another side, where the reflected and transmitted laser beams are merged and transmitting along a desired direction.

Figure 3B:
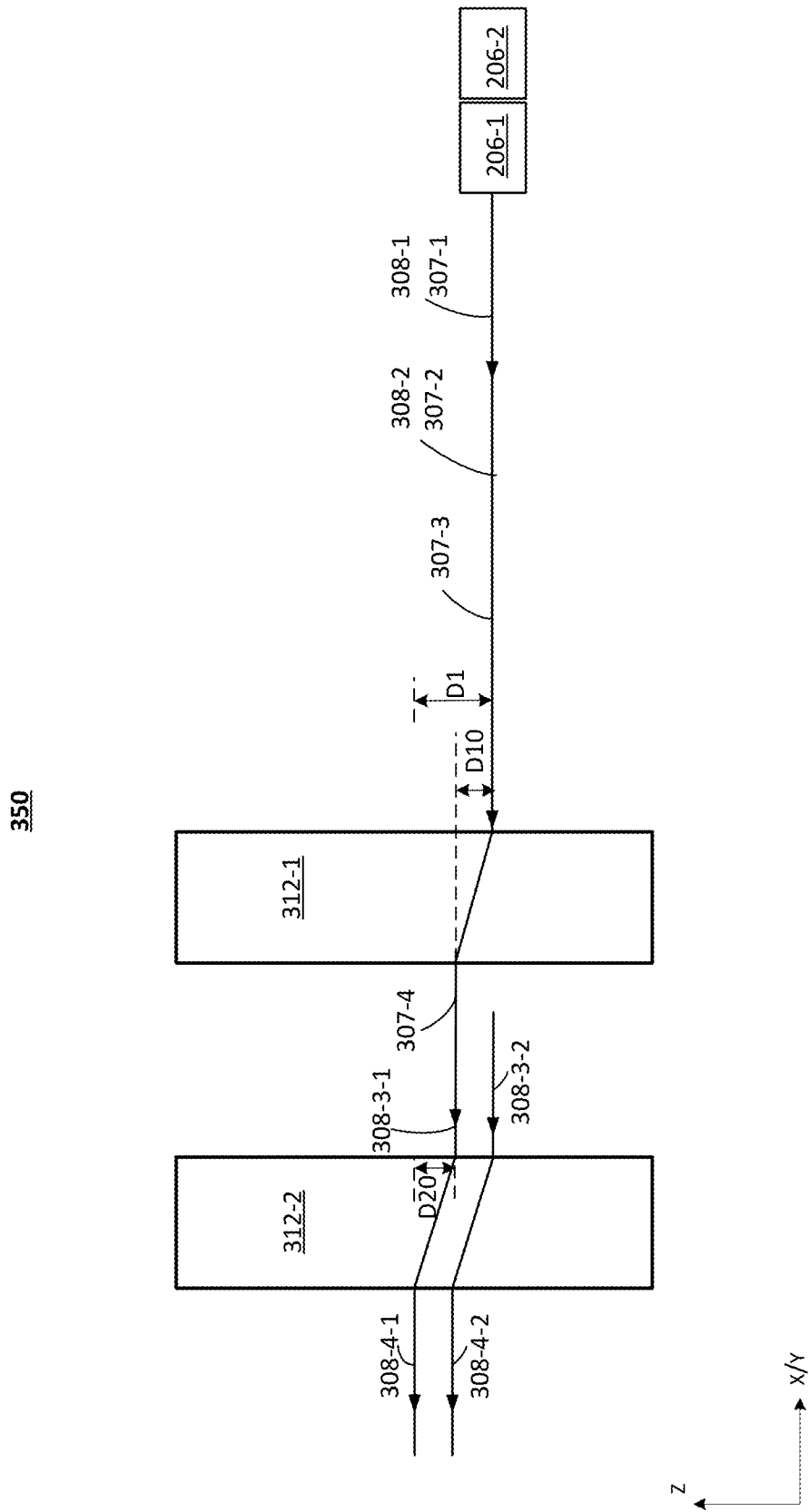
FIG. 3B illustrates a side view of light transmission of a laser beam with two exemplary beam shifters along the A-A' direction in FIG. 3A, according to embodiments of the disclosure.

For example, as shown in FIG. 3A, native laser beams (e.g., 307-1, 308-1, . . . ) may each be an input of the respective collimator (e.g., 304-1, 304-2, . . . ). Laser beams 307-2, 308-2, . . . may be the respective output of collimators 304-1, 304-2, . . . , and may respectively be formed by the collimation of native beams 307-1, 308-1, . . . . Laser beams 307-2, 308-2, . . . may also be the respective input of mirrors 310-1, 310-2, . . . on one side of each mirror. The outputs of mirrors 310-1, 310-2, . . . , are respectively laser beams 307-3, 308-3, . . . . Mirrors 310-1, 310-2, . . . may each be configured to also receive input on another side and transmits the received input together with the reflected laser beam. The input on the other side of a mirror (e.g., 310-2) may include output (e.g., 307-4, 308-4, . . . ) of a beam shifter (e.g., 312-1, 312-2, . . . ). For example, mirror 310-2 may receive inputs along the x-axis (e.g., laser beam 308-2 or output of collimator 304-2) and along the y-axis (e.g., laser beam 307-4 or output of beam shifter 312-1), and transmit output (e.g., laser beam 308-3) along the y-axis, where laser beam 308-3 may include a laser beam formed by the transmission of laser beam 307-4 and the reflection of laser beam 308-2. In some embodiments, laser beams 307-4 and 308-2 are of different elevation along the vertical direction so laser beam 308-3 includes two laser beams of different elevations. Details are illustrated in FIG. 3B. In some embodiments, output of the plurality of mirrors (e.g., 310-1, 310-2, . . . ) may form initial combined laser beams (e.g., 320 and 330) that enter combiner 314 to form combined laser beam 209, each of the initial combined laser beams (e.g., 320 and 330) includes a plurality of laser beams of different elevations.

In some embodiments, at least one of beam shifters (e.g., 312-1 and 312-2) is employed to change the elevation of one or more laser beams before they are transmitted into a combiner (e.g., 314). As shown in FIG. 3A, beam shifters 312-1 and 312-2 may each change elevation of the respective input by a desired displacement so the output of beam shifter 312-2 may approach respective desired elevation. In some embodiments, a laser beam (e.g., 307-3) is transmitted through a plurality of beam shifters (e.g., 312-1 and 312-2) to be shifted a plurality of times to approach a respective desired elevation when entering combiner 314. In some embodiments, a laser beam (e.g., 309-2) is not transmitted through a beam shifter and maintains its original elevation when entering combiner 314. In some embodiments, the elevation of laser beams in initial combined laser beams (e.g., 320 and 330) are different from one another. As needed, one or more beam shifters can also be employed to shift initial combined laser beam (e.g., 320 and/or 330). For example, one or more beam shifters can be placed between mirror 310-3 and combiner 314 to further shift initial combined laser beam 320. The number of beam shifters and location of the beam shifters should not be limited by the embodiments of the present disclosure.

In some embodiments, a beam shifter (e.g., 312-1, 312-2, . . . ) is placed between adjacent mirrors (e.g., 310-1 and 310-2) to vertically shift (e.g., along the vertical direction or the z-axis, shown in FIG. 3B) the input (e.g., laser beam 307-3) transmitting through. The input can be shifted upwardly or downwardly along the vertical direction, depending on the beam shifter. The output (e.g., laser beam 307-4) may have a displacement from the input (e.g., laser beam 307-3) along the vertical direction and may transmit along a direction parallel to the direction of transmission of the input. The beam shifter (e.g., 312-1, 312-2, . . . ) may be customized and/or individually arranged to shift the respective input by a desired displacement so that the elevation of the laser beams in initial combined laser beam (e.g., 320 and 330) along vertical direction may be equal to or approaching the respective desired elevation.

In some embodiments, one or more beam shifters (e.g., 312-1, 312-2, . . . ) may be placed in the transmission paths between one or more PLDs (e.g., 206-1 and 206-2) and combiner 314 to vertically shift each of the one or more laser beams to respective desired elevation. For example, it may be determined that the laser beams emitted by PLDs 206-1, 206-2, and 206-3 (e.g., 307-2, 308-2, and 309-2) have the same elevation. As shown in FIG. 3A, beam shifter 312-1 may be placed between PLD 206-1 and combiner 314, and beam shifter 312-2 may be placed between PLDs 206-1 and 206-2, and combiner 314. Laser beam 307-2 may be shifted twice, e.g., by beam shifters 312-1 and 312-2. Laser beam 308-2 may be shifted once, e.g., by beam shifter 312-2. Laser beam 309-2 may be shifted zero times. In some embodiments, the elevation of the laser beams formed by laser beams 307-2, 308-2, and 309-2 are different from one another in initial combined laser beam 320.

By employing beam shifters, laser beams emitted from single-junction PLDs placed on a leveled surface can be shifted to transmit in different elevation for spatial combining, improving the condition for power combining in combiner 314. The separation of laser beams can be achieved in a cost-effective way.

Details of the working principles of beam shifter 312 is illustrated in FIG. 3B, which is a side view 350 of FIG. 3A along the A-A' direction. For ease of illustration, the transmission of laser beam emitted by PLDs 206-1 and 206-2 are described. PLDs 206-1 and 206-2 may nominally align with each other along the y-axis and the offset between PLDs 206-1 and 206-2 along the x-axis is to distinguish the two PLDs in side view 350. In some embodiments, focusing lenses 302-1 and 302-2, collimators 304-1 and 304-2, and mirrors 310-1 and 310-2 are omitted from FIG. 3B. In some embodiments, PLDs 206-1 and 206-2 respective emits native laser beams 307-1 and 308-1 at a same elevation, which are respectively collimated (e.g., forming laser beams 307-2 and 308-2), and reflected (e.g., forming laser beam 307-3 and a portion of laser beam 308-3). Laser beam 307-3 may pass through and be shifted by beam shifters 312-1 and 312-2. Laser beam 308-2 may pass through and be shifted by beam shifter 312-2. Output of beam shifter 312-1 (e.g., by laser beam 307-4) may transmit through another mirror (not shown) to form an input 308-3-1 of beam shifter 312-2. The other portion of laser beam 308-3, formed by a reflection of laser beam 308-2, form another input 308-3-2 of beam shifter 312-2. In some embodiments, each of beam shifters 312-1 and 312-2 shifts the respective inputs by a same displacement along the vertical direction.

As shown in FIG. 3B, beam shifter 312-1 may shift input 307-3 upwardly along the vertical direction by a first displacement D10, and beam shifter 312-2 may shift the inputs 308-3-1 (e.g., caused by the shifting of laser beam 307-3) and 308-3-2 (e.g., caused by the reflection of laser beam 308-2) each upwardly by a second displacement of D20 to form output of laser beams 308-4-1 and 308-4-2, which are respectively parallel to their respective input of laser beams 308-3-1 and 308-3-2. Laser beams 308-4-1 and 308-4-2 may be separated by a distance of D10 along the vertical direction. D1 represents the total displacement, i.e., nominally equal to a sum of D10 and D20, of laser beam 307-3 after passing through beam shifters 312-1 and 312-2. Outputs (e.g., laser beams 307-4, 308-4-1, and 308-4-2) may each be parallel to the respective inputs (e.g., laser beams 307-3, 308-3-1, and 308-3-2). That is, beam shifters 312-1 and 312-2 can each shift the respective inputs without changing their direction of transmission. The elevation of laser beams 308-4-1 and 308-4-2 may each approach or be equal to their respective desired/optimized elevation for power combining in combiner 314. In some embodiments, laser beam 309-2 may have a different elevation than laser beams 308-4-1 and 308-4-2. In some embodiments, laser beams 307-2, 308-2, and 309-2 transmit at nominally the same elevation, and laser beams 307-2 and 308-2 are shifted so all the laser beams in initial combined laser beam 320 transmit at different elevation.

In some embodiments, the values of displacement (e.g., total displacement formed by all beam shifters and/or an individual displacement formed by a single beam shifter) can be adjusted so the elevation of all laser beams may be equal to or may approach their respective desired elevation for power combining when entering combiner 314. For example, the orientation, material, structure, and/or dimensions of a beam shifter can be customized or adjusted so a beam shifter can provide a desired range of displacement. In another example, the number and location of beam shifters used to adjust the elevation of different laser beams may be determined based on factors such as the range of displacement of a beam shifter, the desired elevation value/range, the cost of a beam shifter, and the dimensions of the beam shifters.

Figure 4:
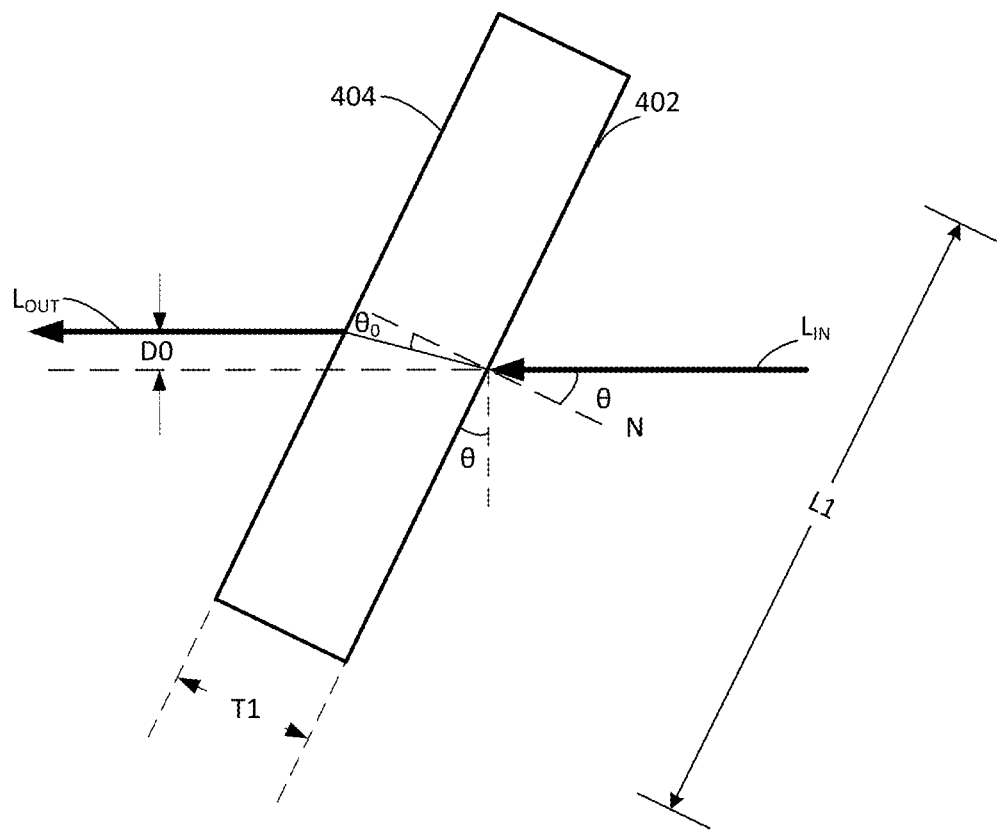
FIG. 4 illustrates a schematic diagram of an exemplary beam shifter, according to embodiments of the disclosure.
Figure 5A:
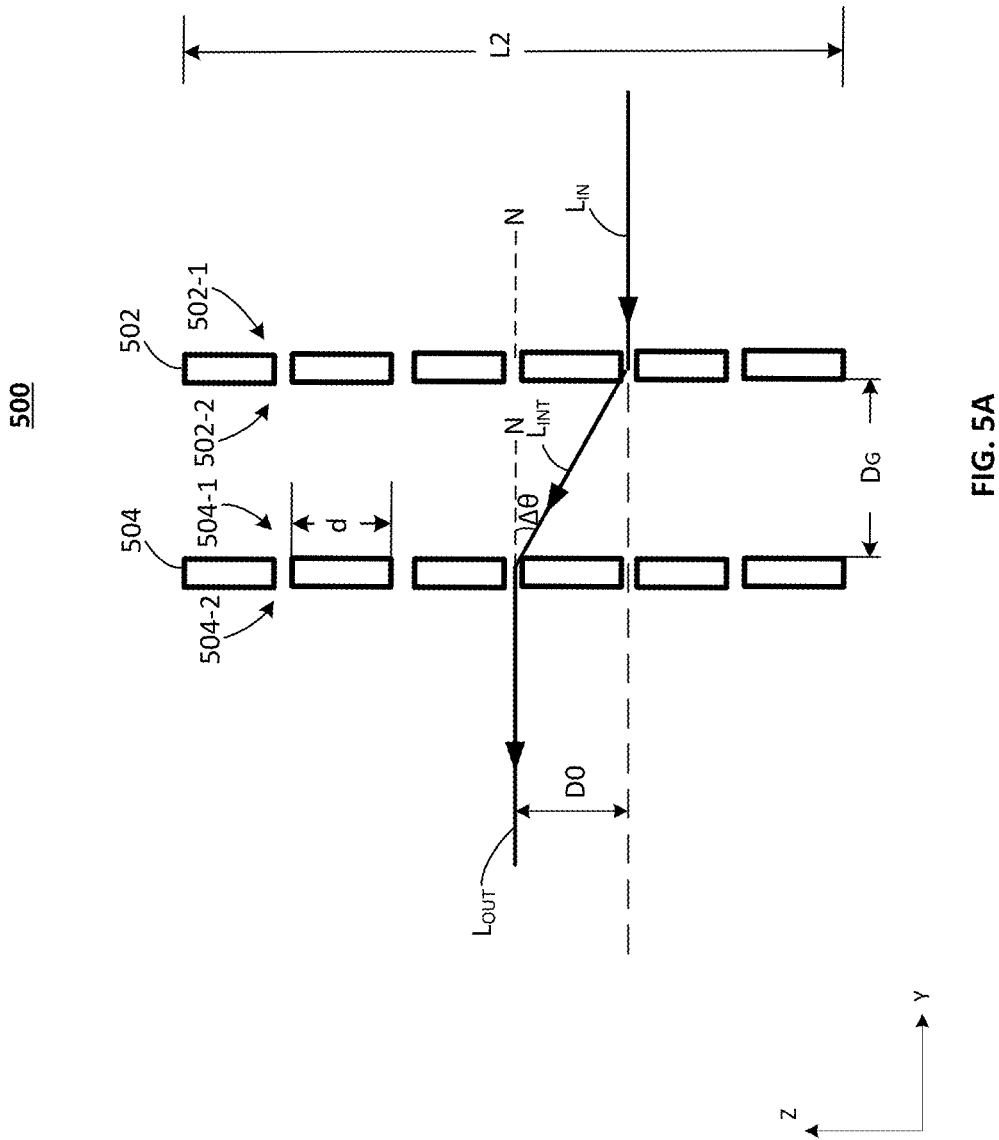
FIGS. 5A and 5B each illustrates a schematic diagram of an exemplary beam shifter, according to embodiments of the disclosure.
Figure 5B:
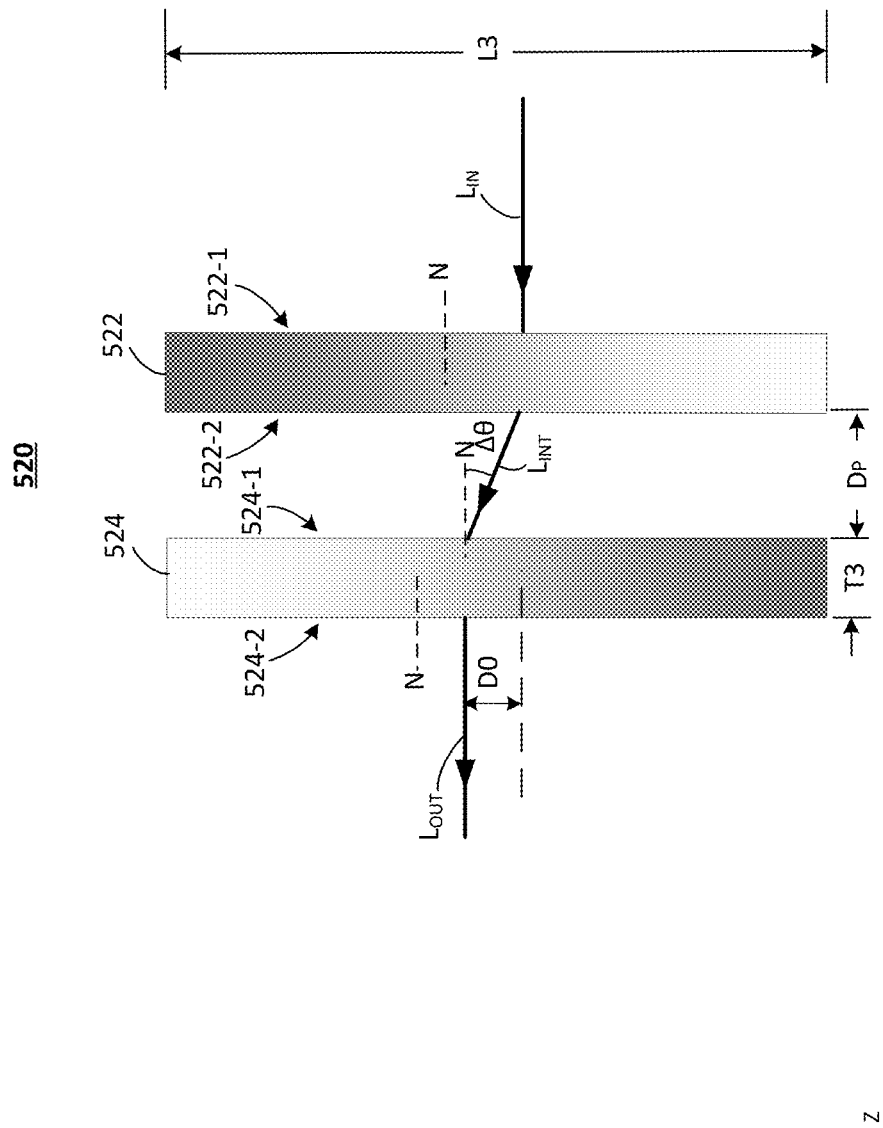

A beam shifter 312 can include any suitable optical device/component that can shift a light beam by a displacement value and/or a range along the vertical direction and maintain the direction of transmission of the light beam. FIGS. 4, 5A and 5B illustrate exemplary optical devices/components that can be included in a beam shifter 312. Exemplary optical devices/components 400, 500, and 520 illustrated in FIGS. 4, 5A and 5B can each be employed as beam shifter 312 in FIGS. 3A and 3B. In some embodiments, beam shifter 312 includes a single one of optical devices/components 400, 500, and 520. In some embodiments, beam shifter 312 includes two or more of optical devices/components 400, 500, and 520. The two or more optical devices/components may be the same or different. Optical devices/components 400, 500, and 520 may each have desirably high transparency to allow a desired amount of light to pass through. Beam shifter 312 may include at least an input surface for receiving a laser beam and an output surface for outputting a laser beam. Consistent with the previous description, the laser beam incident on the input surface is referred to as an input (or input laser beam), and the laser beam exiting the output surface is referred to as an output (or output laser beam). The input and the output may be parallel to each other and may be separated by a displacement along the vertical direction (e.g., the z-axis).

In some embodiments, beam shifter 312 includes a tilted glass plate 400, and the beam shifting of the input includes refraction. FIG. 4 illustrates an exemplary tilted glass plate 400, according to embodiments of the present disclosure. Tilted glass plate 400 may include an input surface 402 and an output surface 404, where a laser beam (e.g., the input $L_{IN}$) is incident on input surface 402 along a horizontal direction (e.g., the y-axis) and another laser beam (e.g., the output $L_{OUT}$) exits output surface 404. Input $L_{IN}$ and output $L_{OUT}$ may be parallel with each other along the horizontal direction. The surface normal of input surface is denoted as N. Tilted glass plate 400 may be tilted away from the vertical direction by an angle of θ, which is equal to the incident angle between input $L_{IN}$ and surface normal N. Tilted glass plate 400 may include a suitable material that allows laser beam to pass through. For example, tilted glass plate 400 may include N-SF-11 glass which has a refractive index n of about 1.785. A displacement D0 can be formed between input $L_{IN}$ and output $L_{OUT}$ caused by the refraction between input surface 402 and output surface 404. For example, the angle of refraction $\theta_0$ may be less than incident angle θ. Displacement D0 may be determined based on incident angle θ, a thickness T1 of tilted glass plate 400, and the refractive index n of tilted glass plate 400. In some embodiments, displacement D0 is calculated as $$D = T1 \times \sin(\theta) \times \left(1 - \frac{\cos(\theta)}{\sqrt{n^2 - \sin^2(\theta)}}\right).$$

In an example, tilted glass plate 400 includes N-SF11 glass, D0 is equal to 0.64 millimeters, T1 is equal to 3 millimeter, and θ can be calculated to be about 24.5°. That is, to obtain displacement D0, the orientation of tilted glass plate 400 can be adjusted so tilted glass plate 400 can have varied angles θ against the vertical direction. A range of displacement values can be obtained by varying incident angle θ. In some embodiments, using the N-SF11 glass having a thickness of 3 millimeters as beam shifter 312, incident angle θ can be varied in a range of about 15 degrees to about 55 degrees, and the displacement can accordingly vary in a range from about 0.35 millimeters to about 3.5 millimeters. In some embodiments, thickness T1 of tilted glass plate 400 is in a range from about 0.5 millimeters to about 5.0 millimeters. In some embodiments, a length L1 of tilted glass plate is in a range from about 1.0 millimeters to about 10.0 millimeters.

In some embodiments, beam shifter 312 includes a plurality of intermediate surfaces between the input surface and the output surface, and at least one intermediate laser beam transmitting through the intermediate surfaces (e.g., from the input surface to the output surface). The displacement between input and output are formed by diffraction. Beam shifter 312 may include a plurality of diffractive optical elements, each separated from one another by a distance. In some embodiments, beam shifter 312 includes a first set of diffraction gratings 502 and a second set of diffraction gratings 504, as illustrated in FIG. 5A. In some embodiments, the first and the second sets of diffraction gratings (e.g., 502 and 504) are identical and are aligned parallel with each other along the vertical direction (e.g., the z-axis). The surface of first set of diffraction gratings 502 that receives an incident laser beam (e.g., input $L_{IN}$) is referred to as an input surface 502-1, and the surface of first set of diffraction gratings 502 that intermediate laser beam (e.g., $L_{INT}$) exits is referred to as a first intermediate surface 502-2. The surface of second set of diffraction gratings 504 that receives intermediate laser beam is referred to as a second intermediate surface 504-1, and the surface of second set of diffraction gratings 504 that an output laser beam exits is referred to as an output surface 504-2. The first and second intermediate surfaces (e.g., 502-2 and 504-1) are parallel to each other along the vertical direction. First set of diffraction gratings 502 and second set of diffraction gratings 504 may be separated by a distance $D_G$ along the horizontal direction (e.g., the y-axis). In some embodiments, a displacement D0 along the vertical direction is formed between input $L_{IN}$ and output $L_{OUT}$ when a laser beam passes through first and second sets of diffraction gratings (e.g., 502 and 504). Input $L_{IN}$ and output $L_{OUT}$ may be parallel with each other along the horizontal direction. The surface normal of input surface 502-1 and second intermediate surface 504-1 are respectively denoted as N.

As shown in FIG. 5A, each set of diffraction gratings include a plurality of slits having spacing d. The laser beam may enter input surface 502-1 (e.g., through slits of first set of diffraction gratings 502) along a horizontal direction (e.g., the y-axis) as input $L_{IN}$, transmit from first set of diffraction gratings 502 to second set of diffraction gratings 504 as intermediate laser beam $L_{INT}$, and exit output surface 504-2 through slits 2 (e.g., of second set of diffraction gratings 504) along the horizontal direction (e.g., the y-axis) as output $L_{OUT}$. Maxima of interference may occur at angle Δθ (e.g., the incident angle of intermediate laser beam on second intermediate surface 524-1) when the laser beam diffracts by transmitting through the slits of first set of diffraction gratings 502. Distance $D_G$ between first and second sets of diffraction gratings (e.g., 502 and 504) may be calculated as $$D_G = \frac{D0}{\Delta\theta},$$

and spacing d may be calculated as $$d = \frac{m\lambda}{\sin\Delta\theta},$$

where m is an integer representing the order of diffraction and λ is the wavelength of the laser beam. For example, if Δθ is 30°, D0 is equal to 0.64 millimeters, λ is equal to 905 nanometers, then $D_G$ is equal to about 1.2 millimeters and d is equal to about 1.81 μm for first order diffraction. In some embodiments, a spacing d of first/second set of diffraction gratings is in a range from about 1.0 μm to about 5.0 μm. In some embodiments, a length L3 of first/second set of diffraction gratings is in a range from about 1.0 millimeters to about 10.0 millimeters.

In some embodiments, beam shifter 312 includes a first phase plate 522 and a second phase plate 524, as illustrated in FIG. 5B. In some embodiments, the first and the second phase plates (e.g., 522 and 524) are identical and are parallel with each other. The surface of first phase plate that receives an incident laser beam (e.g., input $L_{IN}$) is referred to as an input surface 522-1, and the surface of first phase plate 522 that intermediate laser beam (e.g., $L_{INT}$) exits is referred to as a first intermediate surface 522-2. The surface of second phase plate 524 that receives intermediate laser beam is referred to as a second intermediate surface 524-1, and the surface of second phase plate 524 that an output laser beam exits is referred to as an output surface 524-2. First phase plate 522 and second phase plate 524 may be separated by a distance $D_P$ along the horizontal direction (e.g., the y-axis). Input $L_{IN}$ and output $L_{OUT}$ may be parallel with each other along the horizontal direction. In some embodiments, a displacement D0 along the vertical direction is formed between input $L_{IN}$ and output $L_{OUT}$ when a laser beam passes through first and second phase plates (e.g., 522 and 524). The surface normal of input surface 522-1, second intermediate surface 524-1, and output surface 524-2 are respectively denoted as N. In some embodiments, first and second phase plates (e.g., 522 and 524) each has gradient refractive index along the vertical direction (e.g., the z-axis). In some embodiments, first and second phase plates (e.g., 522 and 524) are oriented 180 degrees from each other so that the refractive indices vary oppositely in first and second phase plates (e.g., 522 and 524). For example, the refractive index of first phase plate 522 may increase along the vertical direction and the refractive index of second phase plate may decrease along the vertical direction, or vice versa, depending on, e.g., the relative positions of input $L_{IN}$ and output $L_{OUT}$, and displacement D0. In some embodiments, distance $D_P$ and/or relative position between first and second phase plates (e.g., 522 and 524) are adjusted to allow the laser beam to be incident on desired locations of first and second phase plates (e.g., 522 and 524), leading to desired displacement D0. In some embodiments, the gradient of refractive index of each of first and second phase plates (e.g., 522 and 524) are customized so the phase plates can provide a desired range of displacement.

As shown in FIG. 5B, first and second phase plates (e.g., 522 and 524) are placed parallel to each other along the vertical direction so input can be incident on input surface 522-1 at along a horizontal direction (e.g., the y-axis), and output may exit output surface 524-2 along the horizontal direction. Intermediate laser beam may have an incident angle of $\Delta\theta$ on second intermediate surface 524-1. A distance $D_P$ between the first and second phase plates (e.g., 522 and 544) may be calculated as $$D_P = \frac{D0}{\Delta\theta}.$$

The phase change of the laser beam along the vertical direction in first or second phase plate (e.g., 522 or 524) may be calculated as $\Delta phase(z) = 2\pi(-kz)/\lambda = 2\pi\Delta n(z)T3/\lambda$, and $k = \sin(\Delta\theta)$, where T3 is a width of each of first and second phase plates (e.g., 522 and 544) and $\lambda$ is the wavelength of the laser beam. In an example, when $\Delta\theta$ is 30° and T3 of each of first and second phase plates (e.g., 522 and 524) along the y-axis is about 3 millimeters, $\Delta n(z) = -\sin((\Delta\theta)z/T3 = -0.167z$. Thus, first and second phase plates 522 and 524 can each include a suitable material of sufficiently high transmission rate and having a gradient in refractive index along the vertical direction. For example, first and second phase plates 522 and 524 can each include crown glass (e.g., BK7 glass) doped with ion. The dopant ion can form a gradient in refractive index n(z) of first and second phase plates 522 and 524 along the vertical direction (e.g., n(z) gradually changes from top to bottom of the respective phase plate). In some embodiments, a length L3 of each of first and second phase plates 522 and 524 along the vertical direction may be in a range from about 1.0 millimeters to about 10.0 millimeters. In some embodiments, width T3 of each of first and second phase plates 522 and 524 along the y-axis may be in a range from about 0.2 millimeters to about 1.0 millimeters.

Figure 6:
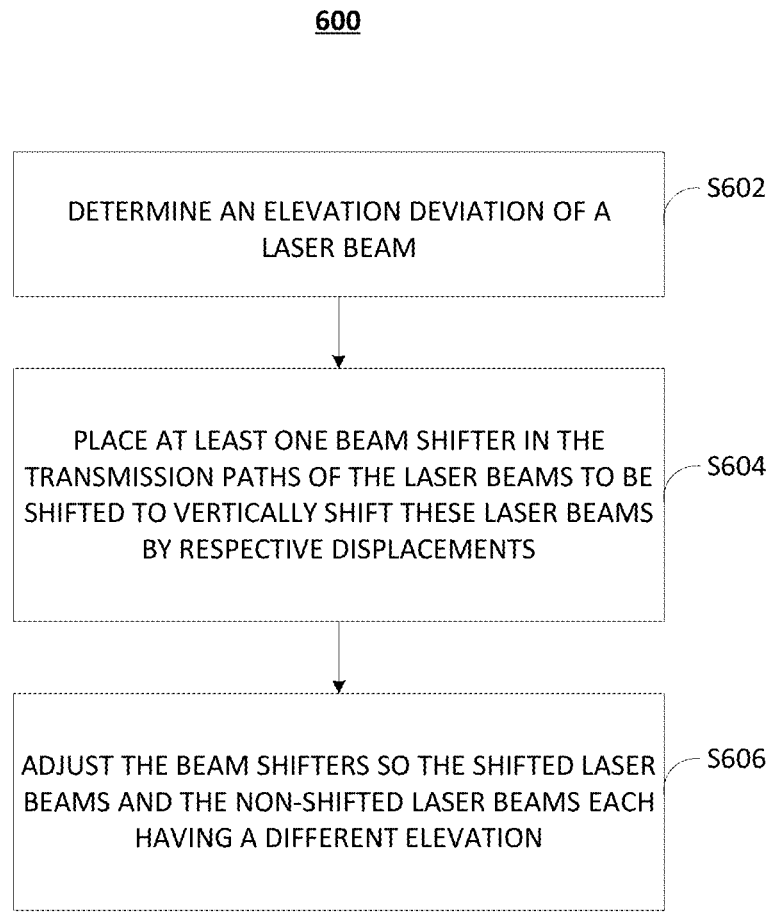
FIG. 6 illustrates a flowchart of an exemplary method to shift a laser beam using a beam shifter, according to embodiments of the disclosure.

FIG. 6 illustrates a method 600 using the disclosed beam shifter to adjust the elevations of laser beams, according to embodiments of the present disclosure. Method 600 may be performed by automated or manual means.

At step S602, the beginning of method 600, an elevation deviation of a laser beam can be determined. The elevation deviation may represent the amount of distance a laser beam needs to be shifted to reach its desired elevation for power combining. In some embodiments, the elevation deviations of all laser beams in transmitter 202 are determined. At step S604, at least one beam shifter may be placed in the transmission paths of the laser beams to be shifted to vertically shift these laser beams each by a respective displacement. One or more beam shifters (e.g., similar to or the same as beam shifters 312) may be placed. In some embodiments, a beam shifter can include one or more of a tilted glass plate, a pair of diffraction gratings, and a pair of phase plates. In some embodiments, one or more beam shifters may be placed between two adjacent mirrors before the laser beams merge to enter the combiner. A beam shifter may be selected based on the elevation deviation determined in S602 and the range of displacement the beam shifter can reach. Details of the beam shifters may be referred to the description of FIGS. 3A-5B, and are not repeated herein. At step S606, each beam shifters can be adjusted, if necessary, so the shifted laser beams and any non-shifted laser beams can each have a different elevation. In some embodiments, the orientation and/or internal structure of a beam shifter can be adjusted so that the input laser beam and the output laser beam are parallel and separated by a desired displacement.

Referring back to FIG. 2, scanner 210 may be configured to emit combined laser beam 209 to an object 212 in a first direction. Scanner 210 may scan object 212 using combined laser beam 209 combined by light modulator 208, within a scan angle at a scan rate. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in a direction within the scan angle. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 216. Lens 214 be configured to collect light from a respective direction in its field of view (FOV). At each time point during the scan, returned laser beam 211 may be collected by lens 214. Returned laser beam 211 may be returned from object 212 and have the same wavelength as combined laser beam 209.

Photodetector 216 may be configured to detect returned laser beam 211 returned from object 212. Photodetector 216 may convert the laser light (e.g., returned laser beam 211) collected by lens 214 into an electrical signal 218 (e.g., a current or a voltage signal). The current is generated when photons are absorbed in the photodiode. In some embodiments of the present disclosure, photodetector 216 may include silicon PIN photodiodes that utilize the photovoltaic effect to convert optical power into an electrical current.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A transmitter for light detection and ranging (LiDAR), comprising:
   a laser source configured to provide a native laser beam, wherein the laser source is placed at a first elevation along a vertical direction;
   a light collimator configured to collimate the native laser beam to form an input laser beam transmitting along a lateral direction perpendicular to the vertical direction;
   a mirror configured to reflect the input laser beam to transmit along the vertical direction; and
   a beam shifter configured to shift the input laser beam along the vertical direction by a predetermined displacement to form an output laser beam at a second elevation along the vertical direction different from the first elevation, the output laser beam and the input laser beam being parallel to each other.

2. The transmitter of claim 1, wherein the beam shifter comprises an input surface configured to receive the input laser beam and an output surface configured to emit the output laser beam, the input surface being parallel with the output surface.

3. The transmitter of claim 2, wherein the beam shifter comprises a tilted glass plate, and wherein the input surface and the output surface each has a tilting angle against the vertical direction, the tilting angle being determined by at least one of an incident angle of the input laser beam on the input surface, a thickness of the tilted glass plate, a refractive index of the tilted glass plate, and the displacement.

4. The transmitter of claim 3, wherein a thickness of the tilted glass plate is in a range from about 0.5 millimeter to about 5.0 millimeter.

5. The transmitter of claim 2, wherein the beam shifter further comprises a plurality of intermediate surfaces between the input surface and the output surface, at least one intermediate laser beam transmitting from the input surface and the output surface through the plurality of intermediate surfaces.

6. The transmitter of claim 5, wherein
   the beam shifter comprises a first and a second diffractive optical elements being parallel with each other and separated from each other by a distance, forming a first intermediate surface and a second intermediate surface between the input surface and the output surface; and
   the input laser beam forms an intermediate laser beam through the first diffractive optical element and the intermediate laser beam forms the output laser beam through the second diffractive optical element, the intermediate laser beam transmitting from the first intermediate surface to the second intermediate surface.

7. The transmitter of claim 6, wherein the first and the second intermediate surfaces are parallel to each other, and the distance is determined based on the displacement and an incident angle of the intermediate laser beam.

8. The transmitter of claim 7, wherein the first and the second diffractive optical elements comprise a first set and a second set of diffraction gratings, and wherein a grating spacing of each of the first and the second sets of diffraction gratings is determined by at least one of the deviation angle of the intermediate laser beam and a wavelength of the intermediate laser beam.

9. The transmitter of claim 8, wherein the grating spacing of each of the first and second sets of diffraction gratings is in a range from about 1.0 μm to about 5.0 μm.

10. The transmitter of claim 7, wherein the first and the second diffractive optical elements comprise a first and a second phase plates each having a gradient refractive index, the first and the second phase plates being oriented 180 degrees from each other and each being aligned along the vertical direction, the gradient refractive index being determined based on at least one of the incident angle of the intermediate laser beam, a thickness of each of the first and the second phase plates, and a location of light transmission in each of the first and the second phase plates.

11. The transmitter of claim 10, wherein the refractive index varies linearly along the respective extending direction in each of the first and the second phase plates, and the thickness of each of the first and the second phase plates is in a range from about 0.2 millimeters to about 1.0 millimeters.

12. A transmitter for light detection and ranging (LiDAR), comprising:
   a laser source comprising a plurality of laser chips configured to provide a plurality of native laser beams, wherein the plurality of laser chips are each placed on a leveled surface of a printed circuit board at a first elevation along a vertical direction;
   a plurality of light collimators configured to collimate the plurality of native laser beams respectively to a plurality of input laser beams transmitting along a lateral direction perpendicular to the vertical direction;
   a plurality of mirrors configured to reflect the plurality of input laser beams respectively to transmit along the vertical direction;
   at least one beam shifter configured to shift at least one of the plurality of input laser beams along the vertical direction each by a respective predetermined displacement to form at least one output laser beam at at least one second elevation along the vertical direction different from the first elevation, the at least one of the plurality of input laser beams being parallel with the respective output laser beam; and
   a beam combiner configured to receive the at least one output laser beam.

13. The transmitter of claim 12, wherein the at least one output laser beam are each at a different second elevation along the vertical direction when being received by the beam combiner, each second elevation being different from the first elevation.

14. The transmitter of claim 12, wherein the beam combiner is further configured to receive at least one of the plurality of input laser beams without being shifted along the vertical direction, the at least one output laser beam and the at least one of the plurality of input laser beams each being at a different elevation along the vertical direction.

15. The transmitter of claim 12, wherein the at least one beam shifter each comprises an input surface configured to receive the input laser beam and an output surface configured to emit the output laser beam, the input surface being parallel with the output surface.

16. The transmitter of claim 15, wherein the at least one beam shifter each comprises a tilted glass plate, and wherein the input surface and the output surface each has a tilting angle against the vertical direction, the tilting angle being determined by at least one of an incident angle of the input laser beam on the input surface, a thickness of the tilted glass plate, a refractive index of the tilted glass plate, and the displacement.

17. The transmitter of claim 15, wherein
the at least one beam shifter each comprises a first and a second diffractive optical elements separated from each other by a distance, forming a first intermediate surface and a second intermediate surface between the input surface and the output surface an being parallel with each other, the distance being determined based on the displacement and a deviation angle of the intermediate laser beam; and
the input laser beam forms an intermediate laser beam through the first diffractive optical element and the intermediate laser beam forms the output laser beam through the second diffractive optical element, the intermediate laser beam transmitting from the first intermediate surface to the second intermediate surface.

18. The transmitter of claim 17, wherein the first and the second diffractive optical elements comprise a first and a second diffraction gratings, and wherein a grating spacing of each of the first and the second diffraction gratings is determined by at least one of the deviation angle of the intermediate laser beam and a wavelength of the intermediate laser beam.

19. The transmitter of claim 17, wherein the first and the second diffractive optical elements comprise a first and a second phase plates each having a gradient refractive index, the first and the second phase plates being oriented 180 degrees from each other and each being aligned along the vertical direction, the gradient refractive index being determined based on at least one of the incident angle of the intermediate laser beam, a thickness of each of the first and the second phase plates, and a location of light transmission in each of the first and the second phase plates.

20. A transmitter for light detection and ranging (LiDAR), comprising:
a laser source comprising a plurality of laser chips configured to provide a plurality of native laser beams, wherein the plurality of laser chips are each placed on a leveled surface of a printed circuit board at a first elevation along a vertical direction;
a plurality of light collimators configured to collimate the plurality of native laser beams respectively to a plurality of collimated laser beams transmitting along a lateral direction perpendicular to the vertical direction;
a plurality of mirrors configured to reflect the plurality of collimated laser beams respectively to transmit along the vertical direction;
a beam shifter configured to shift one of the plurality of reflected laser beams along the vertical direction by a predetermined displacement to form a shifted laser beam at a second elevation along the vertical direction different from the first elevation, the one of the plurality of collimated laser beam being parallel with the shifted laser beam; and
a beam combiner configured to receive the shifted laser beam and at least one non-shifted collimated laser beam, the shifted laser beam at the second elevation along the vertical direction and the at least one non-shifted laser beam at the first elevation along the vertical direction.

* * * * *